United States Patent
Janiszewski et al.

(10) Patent No.: US 8,780,669 B2
(45) Date of Patent: Jul. 15, 2014

(54) SEISMIC ACQUISITION IN MARINE ENVIRONMENTS USING SURVEY PATHS FOLLOWING A SERIES OF LINKED DEVIATED PATHS AND METHODS OF USE

(76) Inventors: Frank D. Janiszewski, Richmond, TX (US); Joel D. Brewer, Houston, TX (US); Shan Shan, Houston, TX (US); Peter M. Eick, Houston, TX (US)

( * ) Notice: Subject to any disclaimer, the term of this patent is extended or adjusted under 35 U.S.C. 154(b) by 785 days.

(21) Appl. No.: 12/940,568

(22) Filed: Nov. 5, 2010

(65) Prior Publication Data

US 2012/0002503 A1      Jan. 5, 2012

Related U.S. Application Data

(60) Provisional application No. 61/260,154, filed on Nov. 11, 2009.

(51) Int. Cl.
*G01V 1/38* (2006.01)
(52) U.S. Cl.
CPC ............ *G01V 1/3826* (2013.01); *G01V 1/3808* (2013.01)
USPC ............................................... 367/20; 367/15
(58) Field of Classification Search
USPC ................................................. 367/15, 20, 21
See application file for complete search history.

(56) References Cited

U.S. PATENT DOCUMENTS

| | | | |
|---|---|---|---|
| 3,747,055 A | 7/1973 | Greene, Jr. | |
| 3,840,845 A * | 10/1974 | Brown | 367/19 |
| 3,953,827 A | 4/1976 | Le Moal et al. | |
| 4,509,151 A | 4/1985 | Anderson | |
| 4,559,605 A | 12/1985 | Norsworthy | |
| 4,567,582 A | 1/1986 | Kuhn | |
| 4,793,274 A | 12/1988 | Regone | |
| 4,967,400 A | 10/1990 | Woods | |
| 5,168,472 A | 12/1992 | Lockwood | |

(Continued)

FOREIGN PATENT DOCUMENTS

| | | | |
|---|---|---|---|
| AU | 20398/92 | * | 7/1995 |
| WO | 2008073178 | | 6/2008 |
| WO | 2008089174 | | 7/2008 |
| WO | 2009066047 | | 5/2009 |

OTHER PUBLICATIONS

Cole et al., "A Circular Seismic Acquisition Technique for Marine Three-Dimensional Surveys", OTC 4864, 17th Annual OTC, HOuston, May 1985.*

(Continued)

*Primary Examiner* — Ian J Lobo
(74) *Attorney, Agent, or Firm* — ConocoPhillips Company (57) ABSTRACT

Methods and systems are provided for acquiring seismic data in a marine environment using survey paths following a series of linked curved paths so as to obtain multi-azimuthal data over a sub-surface target. Marine vessels towing multiple seismic streamers may be configured to travel substantially along a series of linked deviated paths or a series of linked curved paths. Sources may be excited to introduce acoustic wave energy in the marine environment and into the subsea region. The acoustic wave energy then reflects and refracts from the subsea region to form reflected and refracted wave energy, which is detected by seismic receivers spaced along the streamers. The detected seismic data is then interpreted to reveal seismic information representative of the surveyed subsea region. Other enhancements include configuring the streamers in a flared configuration, where the lateral spacing increases rearwardly over the length of the seismic streamers.

21 Claims, 7 Drawing Sheets

(56) References Cited

U.S. PATENT DOCUMENTS

| | | | |
|---|---|---|---|
| 6,009,042 | A | 12/1999 | Workman |
| 6,044,040 | A | 3/2000 | Holland |
| 6,141,622 | A | 10/2000 | Keller et al. |
| 6,366,536 | B1 | 4/2002 | Vallieres et al. |
| 6,418,378 | B1 | 7/2002 | Nyland |
| 6,691,075 | B1 | 2/2004 | Winbow et al. |
| 6,999,879 | B2 | 2/2006 | Houck |
| 7,359,283 | B2 | 4/2008 | Vaage et al. |
| 7,400,552 | B2 | 7/2008 | Moldoveanu et al. |
| 7,415,936 | B2 | 8/2008 | Storteig et al. |
| 7,499,374 | B2 | 3/2009 | Ferber |
| 7,545,703 | B2 | 6/2009 | Lunde et al. |
| 8,547,784 | B2 * | 10/2013 | MacNeill et al. ............... 367/20 |
| 8,559,265 | B2 * | 10/2013 | Moldoveanu et al. ........... 367/16 |
| 2004/0240319 | A1 * | 12/2004 | Carvill et al. ................... 367/21 |
| 2006/0239117 | A1 | 10/2006 | Singh et al. |
| 2007/0064526 | A1 | 3/2007 | Holo |
| 2007/0165486 | A1 * | 7/2007 | Moldoveanu et al. .......... 367/15 |
| 2008/0008033 | A1 | 1/2008 | Fossum et al. |
| 2008/0008036 | A1 | 1/2008 | Morley |
| 2008/0008037 | A1 | 1/2008 | Welker |
| 2008/0019215 | A1 | 1/2008 | Robertsson et al. |
| 2008/0080309 | A1 | 4/2008 | Elkington et al. |
| 2008/0144434 | A1 | 6/2008 | Hegna et al. |
| 2008/0219094 | A1 | 9/2008 | Barakat |
| 2008/0285380 | A1 | 11/2008 | Rouquette |
| 2008/0285381 | A1 | 11/2008 | Moldoveanu et al. |
| 2009/0010101 | A1 | 1/2009 | Lunde et al. |
| 2009/0092004 | A1 | 4/2009 | Toennessen |
| 2009/0122641 | A1 | 5/2009 | Hillesund et al. |
| 2009/0262601 | A1 * | 10/2009 | Hillesund et al. ............... 367/16 |
| 2010/0002536 | A1 | 1/2010 | Brewer et al. |
| 2010/0103772 | A1 | 4/2010 | Eick et al. |
| 2010/0208554 | A1 | 8/2010 | Chiu et al. |

OTHER PUBLICATIONS

PCT Notification of Transmittal of the International Search Report and the Written Opinion of the International Searching Authority, or the Declaration, Forms PCT/ISA/220, 210 and 237, Date of Mailing: Jan. 11, 2011, 12 pages.

U.S. Appl. No. 61/352,098, Jun. 7, 2010, Eick et al.

U.S. Appl. No. 61/353,089, Jun. 9, 2010, Eick et al.

Anthony Day and Thorbjorn Rekdal, PGS Marine Geophysical, "Determining Infill Specifications Based on Geophysical Criteria", 4 pages.

Christian Strand, Ian Buchan and Averrouz Mostavan, "Evaluating Infill Requirements When Acquiring a Marine 3D Seismic Survey Along Pre-Plot Lines", PGS Jim Ross and Dave Monk, Apache, SEG Las Vegas 2008 Annual Meeting, pp. 70-74.

Philippe Capelle, Total Nigeria and Paul Matthews, Total Nigeria, "Intelligent Infill" for Cost Effective 3D Seismic Marine Acquisition, SEG Las Vegas 2008 Annual Meeting, pp. 135-138.

A. Curtis, L Combee and W. Olafsen, P087, "Active Streamer Positioning—In Action", EAGE 64th Conference & Exhibition—Florence, Italy, May 28-30, 2002, pp. 1-4.

\* cited by examiner

SEISMIC ACQUISITION IN MARINE ENVIRONMENTS USING SURVEY PATHS FOLLOWING A SERIES OF LINKED DEVIATED PATHS AND METHODS OF USE

CROSS-REFERENCE TO RELATED APPLICATIONS

This application is a non-provisional application which claims the benefit of and priority to U.S. Provisional Application Ser. No. 61/260,154 filed Nov. 11, 2009, entitled "Seismic Acquisition in Marine Environments Using Survey Paths Following a Series of Linked Deviated Paths and Methods of Use," which is hereby incorporated by reference in its entirety.

FIELD OF THE INVENTION

The present invention relates generally to a method and system for acquisition of seismic data in a marine environment. More particularly, but not by way of limitation, embodiments of the present invention include methods and systems for acquiring seismic data in a marine environment using survey paths following a series of linked deviated paths or linked curved paths.

BACKGROUND

Marine seismic exploration investigates and maps the structure and character of subsurface geological formations underlying a body of water. Marine seismic data is typically gathered by towing seismic sources (e.g., air guns) and seismic receivers (e.g., hydrophones) through a body of water behind one or more marine vessels. As the seismic sources and receivers are towed through the water, the seismic sources generate acoustic energy that travel through the water and into the earth, where they are reflected and refracted by interfaces between subsurface geological formations. The seismic receivers detect the resulting reflected and refracted energy, thus acquiring seismic data that provides seismic information about the geological foundations underlying the body of water.

Typically, large arrays of seismic receivers, often numbering in the thousands, are used to gather marine seismic data. The seismic receivers are generally attached to and spaced apart along streamer cables that are towed behind a marine vessel.

Figure 1:
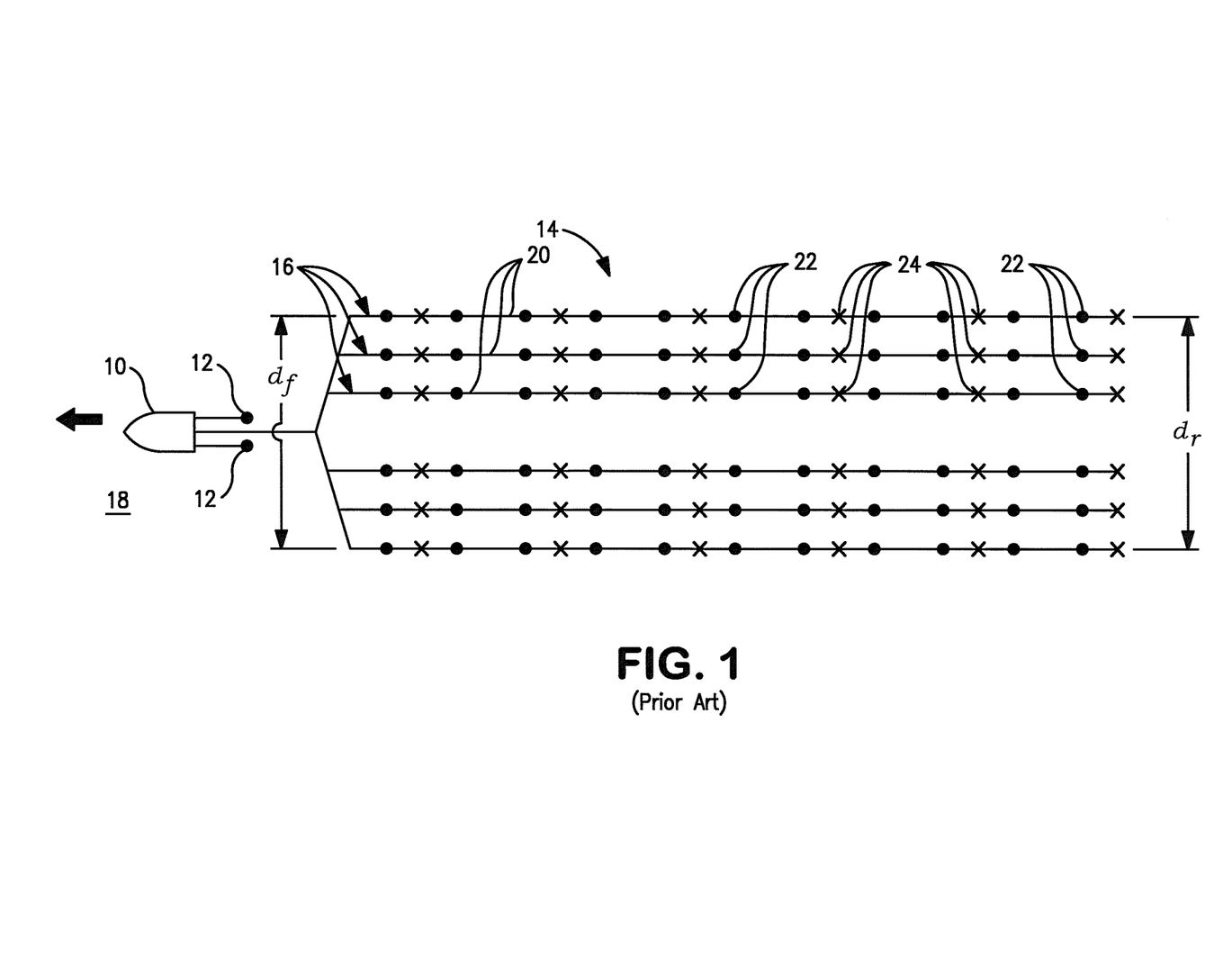
FIG. 1 illustrates a simplified overhead depiction of a conventional marine seismic acquisition system where the lateral spacing between the streamers is substantially constant over the entire length of the streamers.

By way of illustration of such a system, FIG. 1 shows a simplified depiction of a conventional marine seismic data acquisition system employing a marine vessel 10 to tow seismic sources 12 and a system 14 of steerable seismic streamers 16 through a body of water 18.

Each of seismic streamers 16 includes a streamer cable 20, a series of seismic receivers 22 and a series of steering devices 24 coupled to cable 20. Relative positions of the marine seismic receivers during seismic data acquisition can affect the quality and utility of the resulting seismic data. However, unpredictable environmental forces such as currents, winds, and sea states present in many marine environments can cause the relative positions of marine seismic receivers to vary greatly as they are towed through the water. Therefore, it is common for steering devices (commonly know as "birds") to be attached to the streamer cables so that the relative positions (both lateral and vertical) of the seismic receivers can be controlled as they are towed through the water. As depicted in FIG. 1, during conventional marine seismic acquisition, steering devices 24 are used to maintain substantially constant lateral spacing between seismic streamers 16.

Figure 2:
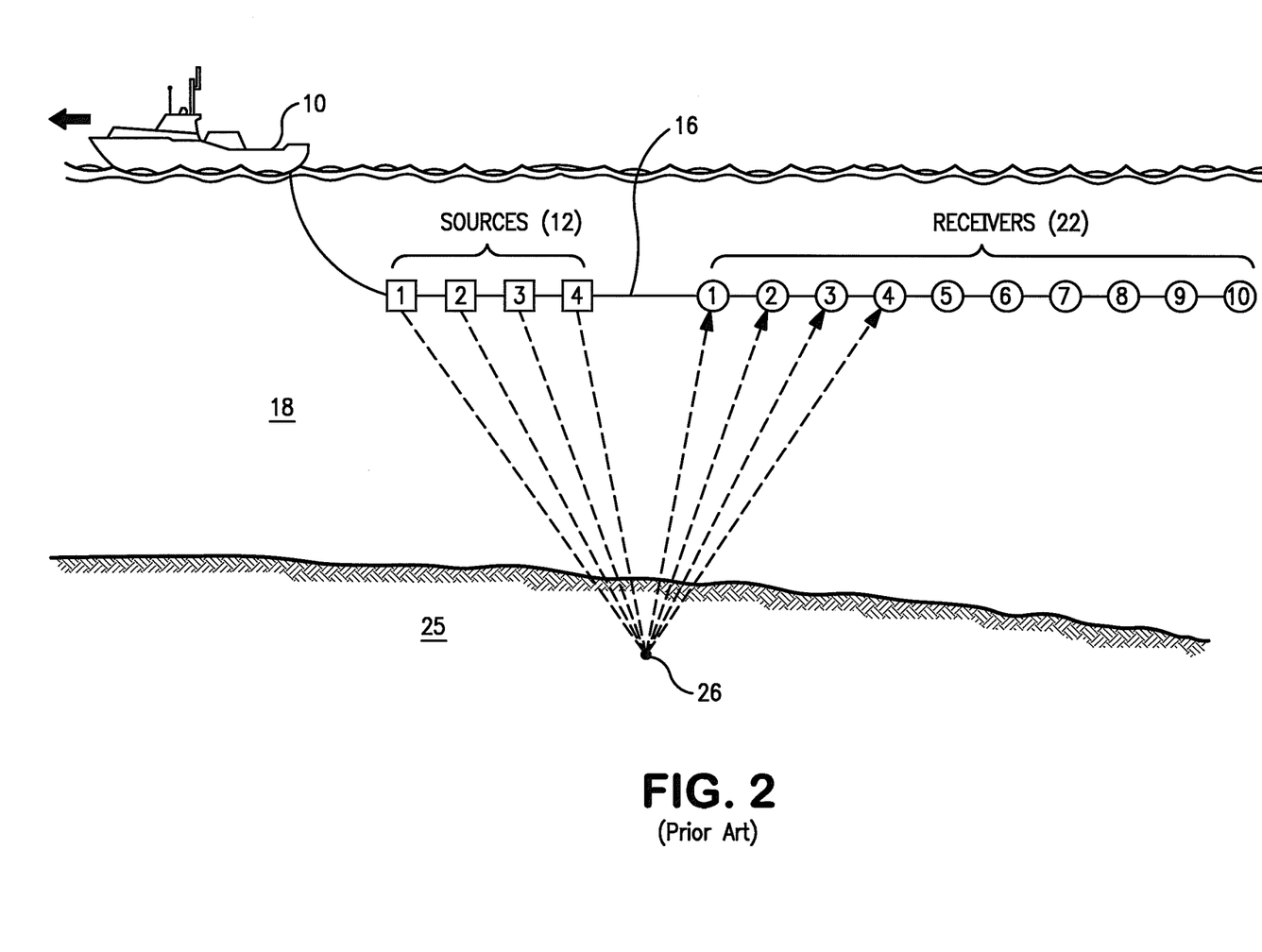
FIG. 2 illustrates a side view of a marine vessel towing a plurality of marine seismic sources and a plurality of marine seismic receivers for conducting seismic surveys of a subsea region of the earth.

As a further illustration of typical marine seismic systems, FIG. 2 illustrates a side view of marine vessel 10 towing one or more streamers 12 having seismic sources 12 (□) and/or seismic receivers 22 (○) through body of water 18 to acquire seismic data for a subterranean geological formation region of interest 26 of geological formation 25.

As marine vessel 10 tows seismic sources 12 and receivers 22 through body of water 18, seismic sources 12 are simultaneously excited, which generate acoustic wave energy that propagates down through water 18 and into geological formation 25. The acoustic wave energy is then reflected and refracted by interfaces between strata of geological formation 25. The resulting reflected/refracted seismic energy then passes upwardly through water 18 and is detected by seismic receivers 22. Additional passes are then conducted to survey additional points of interest. The seismic data detected by seismic receivers 22 then provides seismic information representative of subterranean geological formation of interest 26.

A common problem encountered with conventional marine seismic surveys is "gaps" in the acquired seismic data. These data gaps can occur when the spacing between adjacent acquisition passes is too large to provide sufficient resolution for proper data processing. Gaps in seismic data can be caused by a number of factors including, for example, skewing of the seismic streamers relative to the direction of travel of the towing vessel during data acquisition. Even when steerable streamers are employed, gaps in seismic data are common, particularly when strong crosscurrents are present. When strong crosscurrents are present during seismic data acquisition, it is not practical to maintain all the streamers in desired orientation, because fighting strong crosscurrents with steering devices may produce noise that dramatically reduces the quality of the gathered seismic data.

When gaps in marine seismic data are discovered, if the data gaps cannot be filled by post-acquisition interpolation methods, the areas corresponding to the data gaps must be resurveyed, a process commonly known as "shooting in-fill" or "in-filling." Unfortunately, the existence of gaps in marine seismic data may not be discovered until the initial marine seismic survey has been completed and the resulting seismic data is being processed. Obviously, in-filling is highly undesirable because of the significant expense and time involved in resurveying in-fill areas that may be located hundreds of kilometers from one another or even retransiting the same vessel pass again to make up coverage.

Traditionally, marine seismic surveys using the systems depicted in FIGS. 1 and 2 above are conducted using a series of straight line sail paths across a region on interest. That is, under conventional methods, a marine vessel and its corresponding streamers sail back and forth across a geological region of interest, incrementally moving each subsequent pass or sweep over slightly until all of the combined paths have covered the survey region of interest. In this way, traditional seismic surveys follow a survey path similar to the path followed by one mowing a rectangular section of lawn with a lawn mower, namely, a back and forth straight line path that is moved over incrementally each pass until the entire section of lawn is covered.

Referring again to FIG. 1, traditional marine seismic survey systems employ a set of streamers where the lateral distance ($d_f$) of the forward-most seismic receivers is equivalent to the lateral distance ($d_r$)) of the rearwardly-most seismic receivers. Thus, in surveying a region of interest, a marine vessel 10 will typically employ a back and forth path across a geological region of interest, moving each pass or sweep over by roughly a distance of ½ $d_f$ to a distance of about 1 $d_f$ until the entire region of interest is surveyed. As will be seen below, this method of surveying suffers from a poor randomization and distribution of source point locations and receivers throughout the survey area. For example, for a ten streamer setup with dual sources towed by the streamer vessel, $d_f$ might be about 900 m but each sail line would move over about 500 m. Accordingly, this poor randomization and distribution results in a decreased effectiveness of post-acquisition interpolation methods for filling in seismic data gaps in the acquired data.

Consequently, this method of surveying with a series of straight paths across a region is a highly inefficient way of gathering off-set and azimuth distributions. Using conventional methods to acquire wide azimuth distributions requires multiple passes down the same line with multiple boats, usually a single streamer vessel and multiple source vessels or two streamer vessels and multiple source vessels. Even using multiple passes and multiple vessels, the azimuth distribution acquired is still limited in certain directions. In this way, conventional methods of seismic surveys fail to provide full offset and azimuth data and further fail to optimize the randomization of the offset and azimuth data available. Accordingly, conventional methods of surveying a region are unnecessarily more costly in terms of both time and direct survey costs. Indeed, the cost of acquiring wide-azimuth data essentially increases by the cost of the number of passes required down each sail line to obtain the azimuth range required. For conventional marine surveys that are not wide azimuth, costs can be increased by as much as 50% by infill needs.

Accordingly, there is a need in the art for improved seismic survey methods and systems that address one or more disadvantages of the prior art.

SUMMARY

The present invention relates generally to a method and system for acquisition of seismic data in a marine environment. More particularly, but not by way of limitation, embodiments of the present invention include methods and systems for acquiring seismic data in a marine environment using survey paths following a series of linked deviated paths or linked curved paths.

One example of a method for acquiring seismic data for a subsea region of the earth comprising the steps of: providing a marine vessel and a plurality of seismic streamers, wherein the plurality of seismic streamers are coupled to the marine vessel for towing, wherein each seismic streamer comprises a plurality of marine seismic receivers spaced apart along the length of each seismic streamer; providing one or more marine seismic sources; introducing the marine seismic sources into a marine environment in range of the marine seismic receivers; towing the seismic streamers through the marine environment such that the marine vessel and the seismic streamers travel substantially along a first series of linked curved paths; exciting at least one of the marine seismic sources simultaneously with the step of towing the seismic streamers so as to cause acoustic wave energy to travel through the marine environment into the subsea region of the earth; allowing the acoustic wave energy to reflect and refract from the subsea region so as to form reflected and refracted wave energy; and detecting the reflected and refracted wave energy with the marine seismic receivers so as to form detected seismic data.

The seismic streamers may optionally be configured in a flared configuration. In certain embodiments, the seismic streamers may be steerable so as to achieve various desired streamer configurations.

Suitable examples of series of linked curved paths may include a plurality of half-ellipses, a plurality of alternating or inverted half-ellipses, sinusoidal wave paths, a plurality of linked half-sine waves, a plurality of linked inverted half-sine waves. In certain embodiments, the survey path may form a sinusoidal wave having a substantially constant wavelength.

The lengths of the seismic streamers may vary, some configurations extending to a length at least as long as a quarter of the wavelength of the sinusoidal wave or to a length at least as long as half a wavelength of the sinusoidal wave.

Where the survey paths are comprised of a plurality of half-ellipses that are substantially identical in shape, the length of the seismic streamers may have a length at least as long as a length circumscribed by half of one of the half-ellipses or at least as long as the length circumscribed by one of the half-ellipses.

In certain embodiments, the survey paths of the marine vessel and the seismic streamers may follow a series of deviated survey paths. Examples of suitable deviated survey paths include triangle survey paths, square wave survey paths, or any combination thereof.

The features and advantages of the present invention will be apparent to those skilled in the art. While numerous changes may be made by those skilled in the art, such changes are within the spirit of the invention.

BRIEF DESCRIPTION OF THE DRAWINGS

A more complete understanding of the present disclosure and advantages thereof may be acquired by referring to the following description taken in conjunction with the accompanying figures, wherein.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The present invention relates generally to a method and system for acquisition of seismic data in a marine environment. More particularly, but not by way of limitation, embodiments of the present invention include methods and systems for acquiring seismic data in a marine environment using survey paths following a series of linked deviated paths or linked curved paths.

Methods and systems are provided for acquiring multi-azimuthal data over a sub-surface target. In certain embodiments, a marine vessel towing multiple seismic streamers may be configured to travel substantially along a series of deviated linked paths or linked curved paths, which may optionally take the form of a series of linked half-ellipses, linked half-sinusoidal waves, other linked curved paths, or any combination thereof. In some embodiments, the survey paths of the marine vessel and its corresponding seismic streamers substantially form a sinusoidal wave. As the marine vessel travels along the series the linked curved paths, one or more sources may be excited so as to introduce acoustic wave energy in the marine environment and subsequently into the subsea region of the earth. The acoustic wave energy then reflects and refracts from the subsea region so as to form reflected and refracted wave energy, which is detected by marine seismic receivers that are spaced along the length of the seismic streamers. The detected seismic data is then interpreted to reveal seismic information representative of the surveyed subsea region of the earth.

Advantages of certain embodiments of the present invention include, but are not limited to, a reduction of the number of marine vessel runs or paths required to complete a survey area, increased survey efficiency and coverage, a more effective randomization of the locations of source point and receivers throughout the area, a reduction of the acquisition footprint in the final processed data, an increase of the effectiveness of post-acquisition interpolation methods used to fill holes or gaps in the acquired data, lower survey costs, decreased survey times, and maximization of the available offset and wide azimuth data.

Other enhancements to the methods herein include, but are not limited to, configuring the streamers in a flared configuration, wherein the lateral spacing increases rearwardly over the length of the seismic streamers or a trumpet-shaped system of variable length seismic streamers exhibiting lateral streamer spacing that increases rearwardly at an increasing rate over the length of the seismic streamers. U.S. patent application Ser. No. 12/167,683, filed Jul. 3, 2008, titled "Marine Seismic Acquisition with Controlled Streamer Flaring," the entire disclosure of which is incorporated by reference, describes a number of possible streamer configurations, streamer elements, and devices, all of which may be used in combination with embodiments of the present invention.

Many other variations are possible as described in further detail below. For example, one or more additional marine vessels also towing seismic streamers may be used in cooperation with the first marine vessel to form any portion of the series of linked curved paths.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

Figure 3:
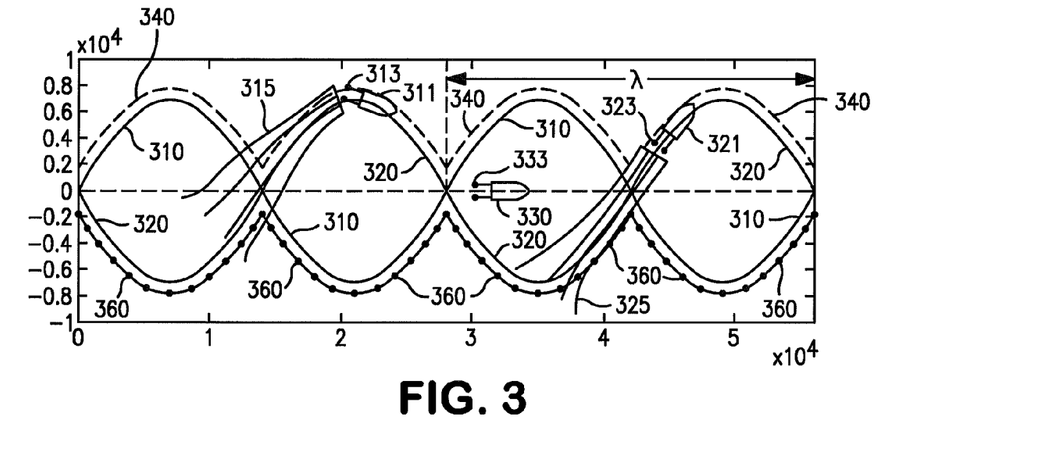
FIG. 3 illustrates an exemplary pair of sinusoidal or elliptical vessel survey paths that may be traversed with one or more marine streamer vessels in accordance with one embodiment of the present invention.

FIG. 3 illustrates an exemplary pair of sinusoidal or elliptical vessel survey paths that may be traversed by one or more marine streamer vessels in accordance with one embodiment of the present invention. As described above with respect to FIGS. 1 and 2, surveying a region of interest with a series of straight line paths is an inefficient method of gathering seismic data.

Rather, it has been discovered that surveying using a series of linked deviated paths or a series of curved linked paths results in a far more efficient randomization of seismic source and receiver locations and angles, which increases the efficiency and effectiveness of post-acquisition interpolation methods. Examples of survey paths in accordance with the present invention are shown in FIG. 3. For example, survey path 310 is survey path in the form of a sinusoidal wave. Survey path 320 is a survey path also in the form of a sinusoidal wave but inverted with respect to survey path 310.

Here, first marine vessel 311 follows survey path 310, whereas second marine vessel 321 follows survey path 320. In this way, each marine vessel 311 and 321 follow survey paths that are sinusoidal and inverted with respect to one another.

First marine vessel 311 tows seismic sources 313 and seismic streamers 315. Likewise, second marine vessel 321 tows seismic sources 323 and seismic streamers 325. As each marine vessel 311 and 321 follow each survey path 311 and 321, the paths travelled by their corresponding seismic streamers 315 and 325 also travel substantially along approximately the same respective survey paths, making allowances for wind and ocean current influences, which may perturb the positions of seismic streamers 315 and 325 despite the corrections offered by their respective steering mechanisms, which attempt to correct for these external influences.

In this way, the azimuth angles between the receivers and the sources constantly vary throughout each survey path as each marine vessel progresses along each sinusoidal survey path. These varying angles result in an effective randomization of the offset and azimuth seismic data detected.

Many variations of the above method are possible. Survey paths 311 and 321 may be circumscribed by one marine vessel acting alone or by two or more marine vessels surveying in cooperation with one another. Any number of vessels could conduct a survey along any portion of survey paths 311 and 321 such that the combination of all individual survey paths covers the entirety of survey paths 311 and/or 321.

In certain embodiments, an optional marine vessel such as optional marine vessel 330 may be introduced to provide a stationary or moving seismic source or sources 333 as desired. These additional seismic sources 333 may be in addition to seismic sources 313 and 323 or in alternative to seismic sources 313 and 323. Seismic sources 313, 323, and 333 may be introduced to any location within range of any seismic detectors being used to detect reflected and refracted acoustic wave energy from seismic sources 313, 323, and 333.

Alternatively, a marine vessel could follow upper alternate survey path 340, which is a series of linked half-sine waves, while another marine vessel follows lower alternative survey path 360. As before, either or both of these paths could be surveyed by any number of marine vessels acting in cooperation with one another, with each vessel surveying non-overlapping or overlapping portions of each survey path 340 and 360.

Where multiple seismic marine vessels cooperate with one another to complete a shared survey, it is explicitly recognized that these vessels may operate simultaneously with one another, sequentially with one another, time-lagged off-set with one another, or any combination thereof.

Figure 4:
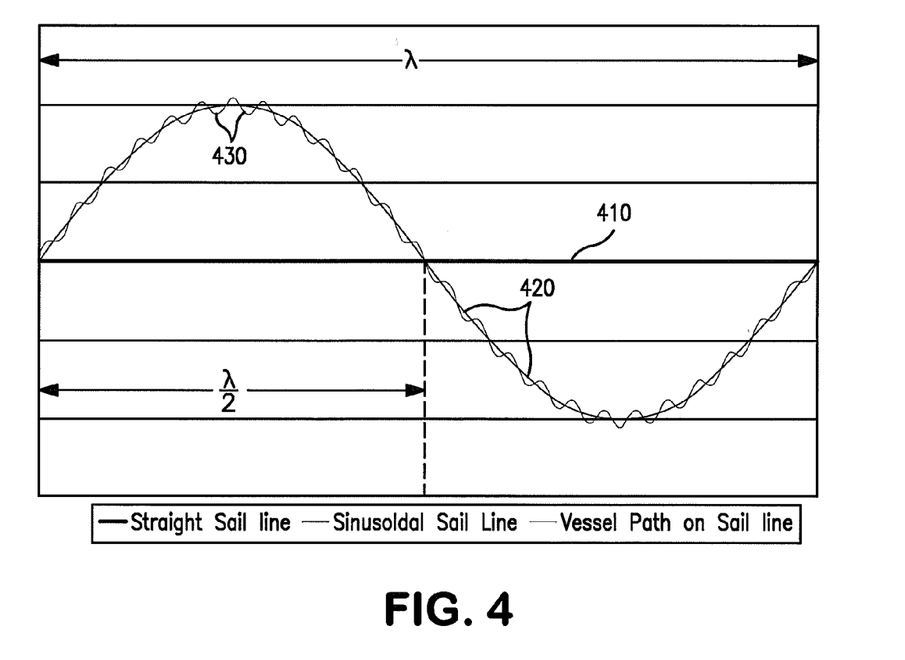
FIG. 4 illustrates, for comparison purposes, examples of various possible sail line survey paths, namely a straight sail line, a sinusoidal sail line, and a possible actual vessel path on a sail line.

FIG. 4 illustrates, for comparison purposes, examples of various possible sail line survey paths, namely a straight sail line, a sinusoidal sail line, and a possible actual vessel path on a sail line. Sail line 410 is an example of a conventional survey path, which suffers from, among other things, a lack of diversity and randomization of offset and azimuth data. Sinusoidal sail line 420 represents an example of an ideal sail line survey path that results in a wider sampling and scattering of locations and of source points and receivers throughout the survey area. Actual vessel path on sail line 430 represents an actual vessel path that a vessel might travel when attempting to follow sail path line 420 due to countervailing winds, ocean currents, and other environmental factors.

Marine seismic streamer systems may employ in the range of about 2 to about 100 individual seismic streamers, in the range of about 4 to about 50 individual seismic streamers, or in the range of about 5 to about 25 individual seismic streamers. At least two of the seismic streamers 36 may have a length in the range of about 0.5 to about 30 kilometers, in the range of about 2 to 20 about kilometers, or in the range of about 4 to about 12 kilometers. In one embodiment, at least one-half of the seismic streamers employed in the seismic streamer system may have a length within one or more of the above-recited ranges. In another embodiment, all of the seismic streamers employed in the seismic streamer system have a length within one or more of the above-recited ranges.

In certain embodiments, the length of the seismic streamer may vary from at least about ¼ of a wavelength, to at least about ½ of a wavelength, or to at least about a wavelength of the sinusoidal survey path. By increasing the length of the seismic streamer to correspond to a minimum length of the sinusoidal survey path, a certain level of offset and azimuth diversity and randomization can be assured as a result of the source and receiver locations as the seismic streamers travel along the survey path.

Figure 5:
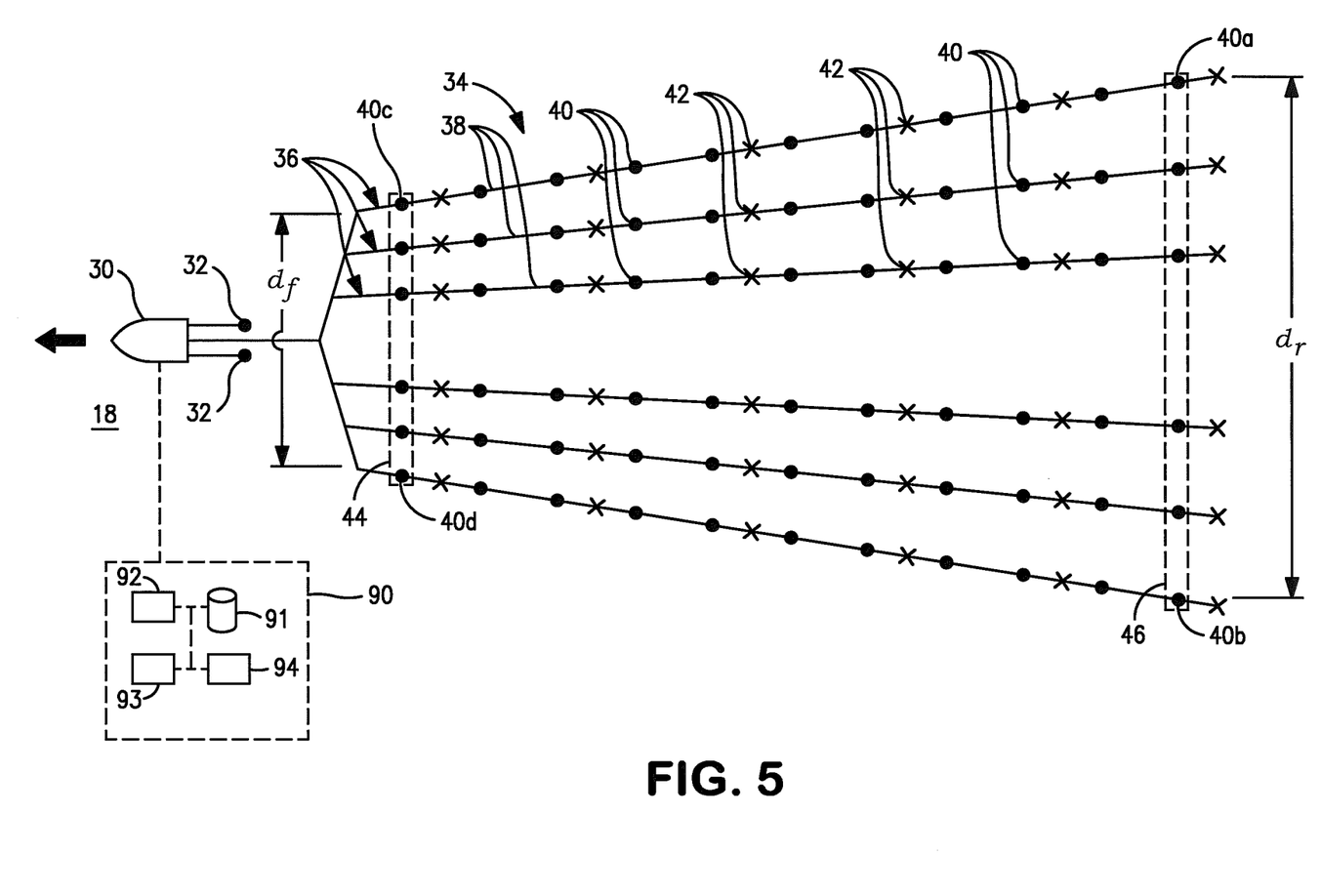
FIG. 5 illustrates a simplified overhead depiction of a marine seismic acquisition system where the lateral spacing between the streamers increases rearwardly over the length of the seismic streamers.

FIG. 5 illustrates a simplified overhead depiction of a marine seismic acquisition system useful in combination with certain embodiments of the present invention. Here, the lateral spacing between streamers increases rearwardly over the length of the seismic streamers, also known as a flared configuration. This flared configuration is especially advantageous when used in combination with seismic survey paths following a series of linked curved paths such as those described above.

Here, marine vessel 30 tows marine seismic system 34 through body of water 18. Marine seismic system comprises seismic sources 32 and seismic streamers 36. Seismic streamers 36 in turn comprise cables 38, seismic receivers 40 spaced apart along the length of cables 38, and steering devices 42. It is explicitly recognized that seismic streamers 36 may be spaced apart equidistant one another, at irregular spacings, or any combination thereof as desired. Steering devices 42 assist in maintaining relative lateral distances between seismic receivers 40 as desired.

As can be seen in FIG. 5, rearward-most group of seismic receivers 46 span a distance $d_r$, which is greater than the distance $d_f$, the distance spanned by the front-most group of seismic receivers 44. In certain embodiments, the seismic streamer system 34 is in a flared configuration when the lateral distance ($d_r$) between the outer-most, rearward-most seismic receivers 40a,b is at least about 2 percent, at least about 5 percent, at least about 10 percent, at least about 20 percent, or in the range of about 30 to about 400 percent greater than the lateral distance ($d_f$) between the outer-most, front-most seismic receivers 40c,d.

When coupling seismic streamers to one or more marine vessels, the term "coupled to," as used herein, refers to both direct and indirect coupling such that an intervening element may exist between seismic streamer and the marine vessel. As the term is used herein, only the term "coupled to" requires at most an operable coupling of the seismic streamers to a marine vessel.

One or more methods of the present invention may be implemented via an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU or processor) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

As an example of one implementation of an information handling system for use in combination with the present invention, seismic data is communicated to information handling system 90, which is comprised of processor 92, data storage device 91, display 94, and optional interpreter 93. Seismic data collected from seismic receivers 40 may be communicated to information handling system 90 to processor 92 for storage in data storage device 91. The seismic data may then be interpreted by interpreter 93. Alternatively, in some embodiments, interpreter 93 is located external to information handling system 90 and consequently, this step may be performed at a later date when seismic data is later retrieved from data storage device 91.

Figure 6:
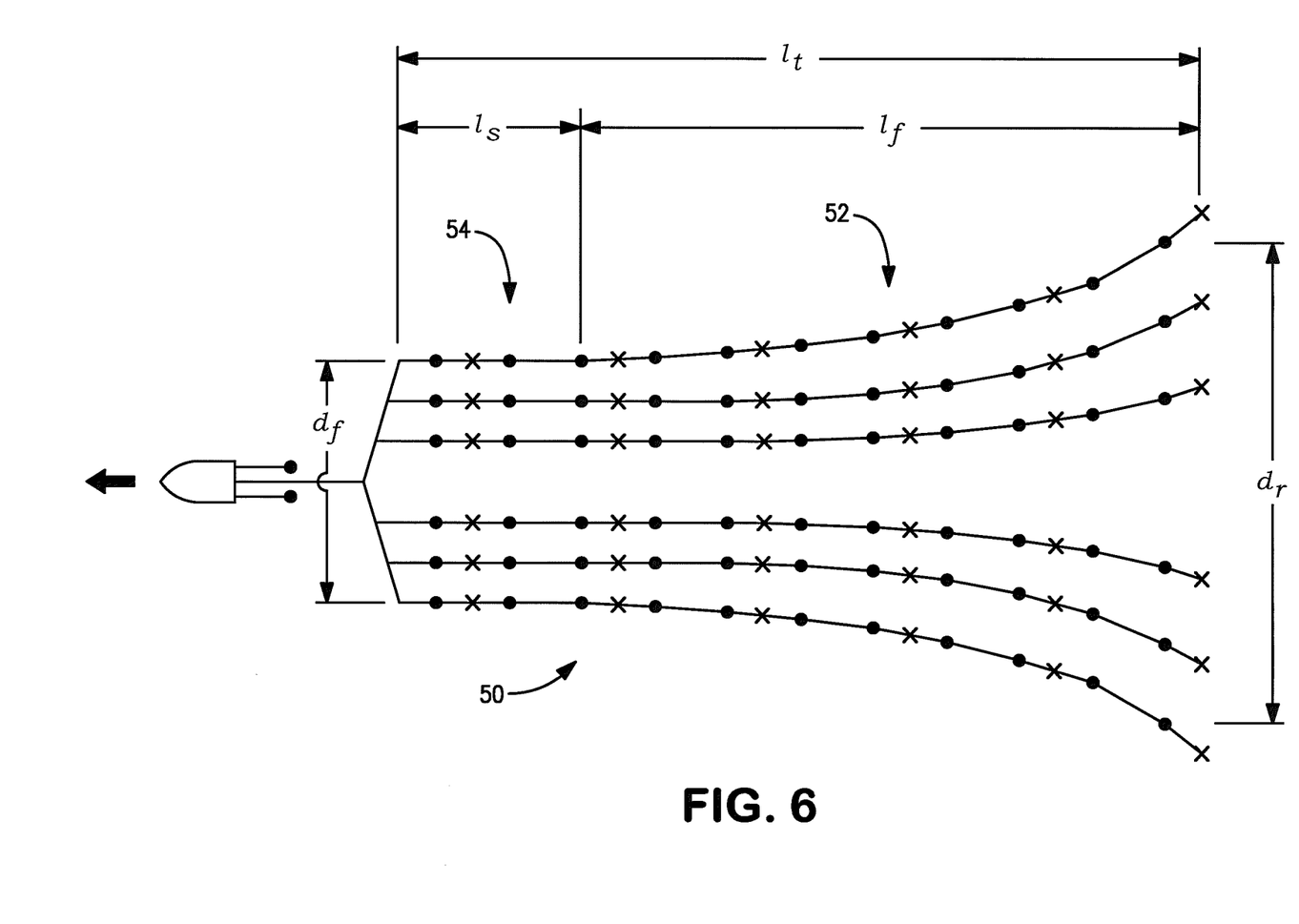
FIG. 6 illustrates a simplified overhead depiction of a marine seismic acquisition system with seismic streamers shown in a flared-configuration and more specifically, illustrating a trumpet-shaped system of variable length seismic streamers exhibiting lateral streamer spacing that increases rearwardly at an increasing rate over the length of the seismic streamers.

FIG. 6 illustrates a simplified overhead depiction of a marine seismic acquisition system with seismic streamers shown in yet another flared-configuration and more specifically, a trumpet-shaped system of variable length seismic streamers exhibiting a rearwardly increasing rate of flaring in flared section 52 of seismic streamer system 50. As used herein, the "flared section" of a seismic streamer system refers to the section of the seismic streamer system that is in a flared configuration. Thus, for the seismic streamer system 34 of FIG. 5, the entire length of the streamer system 34 would be considered a flared section. For the seismic streamer system 50 of FIG. 6, however, the flared section 52 has a length ($l_f$) that is less than the total length ($l_t$) of the seismic streamer system 50. As depicted in FIG. 3 the seismic streamer system 50 can also include a non-flared/straight section 54 that exhibits substantially constant streamer spacing over its length ($l_s$).

In accordance with various embodiments of the present invention, the length ($l_f$) of the flared section of a seismic streamer system can be at least 5 percent, at least 10 percent, at least 20 percent, at least 40 percent, at least 60 percent, at least 80 percent, or at least 100 percent of the total length ($l_t$) of the seismic streamer system. In accordance with certain embodiments, the flared section of a seismic streamer system can exhibit an average lateral spacing between adjacent seismic streamers that increases rearwardly at a rate of at least 0.001 meters (lateral) per meter (longitudinal), at least 0.002 meters per meter, at least 0.005 meters per meter, at least 0.01 meters per meter, at least 0.05 meters per meter, or at least 0.1 meters per meter.

Many other configurations are possible as would be recognized by a person of ordinary skill in the art with the benefit of this disclosure. U.S. patent application Ser. No. 12/167,683, filed Jul. 3, 2008, titled "Marine Seismic Acquisition with Controlled Streamer Flaring," the entire disclosure of which is incorporated by reference, describes a number of possible streamer configurations, streamer elements, and devices, all of which may be used in combination with embodiments of the present invention.

Figure 7A:
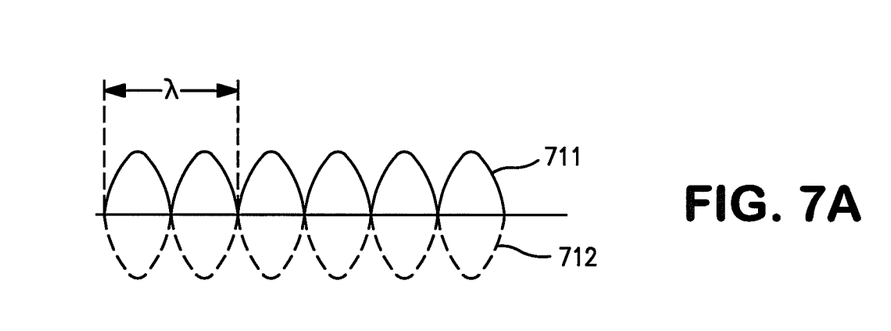
FIGS. 7A-7D illustrates additional sail line survey paths in accordance with various embodiments of the present invention.
Figure 7B:
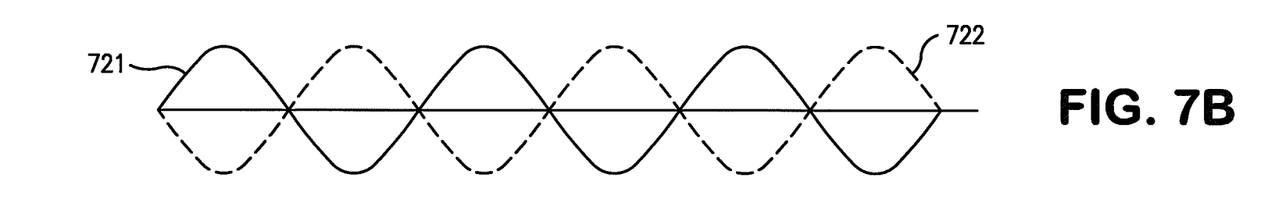
Figure 7C:
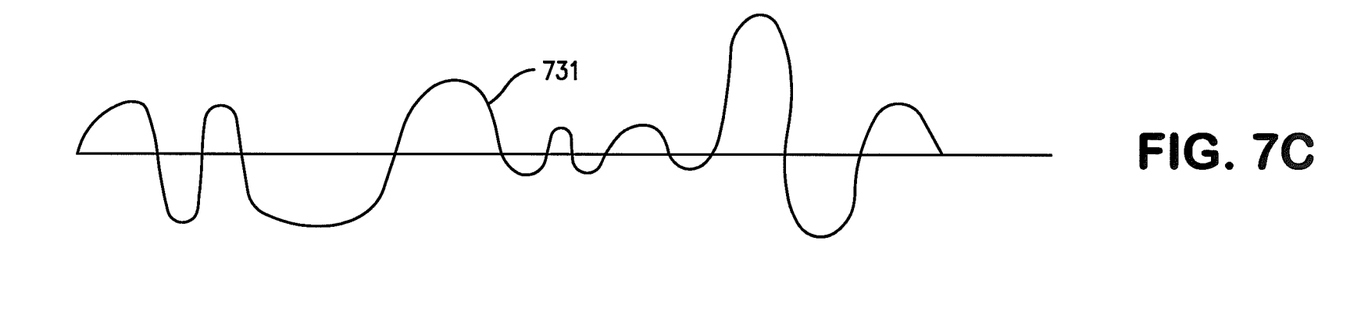

FIGS. 7A-7C illustrates additional sail line survey paths in accordance with various embodiments of the present invention. Although sinusoidal and half-ellipse survey paths have been specifically illustrated above, many other survey paths are suitable in combination with the present invention. Indeed, any survey path comprising a plurality of linked or connected curved paths are suitable for use with the present invention. Examples of suitable survey paths include, but are not limited to, a series of linked half-ellipses, a series of linked half-sine waves, a series of alternating linked half-ellipses, survey paths having a sinusoidal wave form, or any combination thereof. As used herein, the term "alternating" refers to survey paths in which each crest wave is inverted with respect to the previous wave, in an alternating crest/trough pattern as illustrated, for example, by the waveform shown in The amplitude and/or frequency or pitch of such survey paths may be constant or variable as desired depending on various factors, including the region to be surveyed, available equipment and resources, and external conditions such as wind direction and speed and ocean currents.

FIGS. 7A, 7B, 7C and 7D show some non-limiting examples of survey paths suitable for use with the present invention. In particular, FIG. 7A shows two survey paths 711 and 712, each of constant wavelength $\lambda$. Here, wavelength $\lambda$ is defined as the distance of the survey path that spans at least two crests, two troughs, or as indicated in FIG. 7A, the distance between two zero crossings.

Survey path 711 is formed by a series of linked half-sine waves, whereas survey path 712 is formed by a series of linked half-sine waves that are inverted with respect to survey path 711. In one embodiment, one marine vessel could travel along a portion of survey path 711 while a second marine vessel travels along a portion of survey path 712. In this way, two marine vessels acting in cooperation with one another may complete the combination of survey paths 711 and 712.

It is explicitly recognized that either or both of survey paths 711 and 712 may be surveyed by any combination of paths that when taken together form one or both of survey paths 711 and 721. For example, as shown in FIG. 7B, one marine vessel could travel along survey path 721 while another marine vessel travels along survey path 722. Additionally, when more than one marine vessel cooperates with another marine vessel, it is explicitly recognized that the survey paths may be completed simultaneously, sequentially, time-lagged off-set with one another, or any combination thereof.

FIG. 7C shows an example of an irregular survey path 731. Here, survey path 731 follows a series of linked curved paths wherein the amplitude and wavelength of each curved path vary as desired.

Figure 7D:
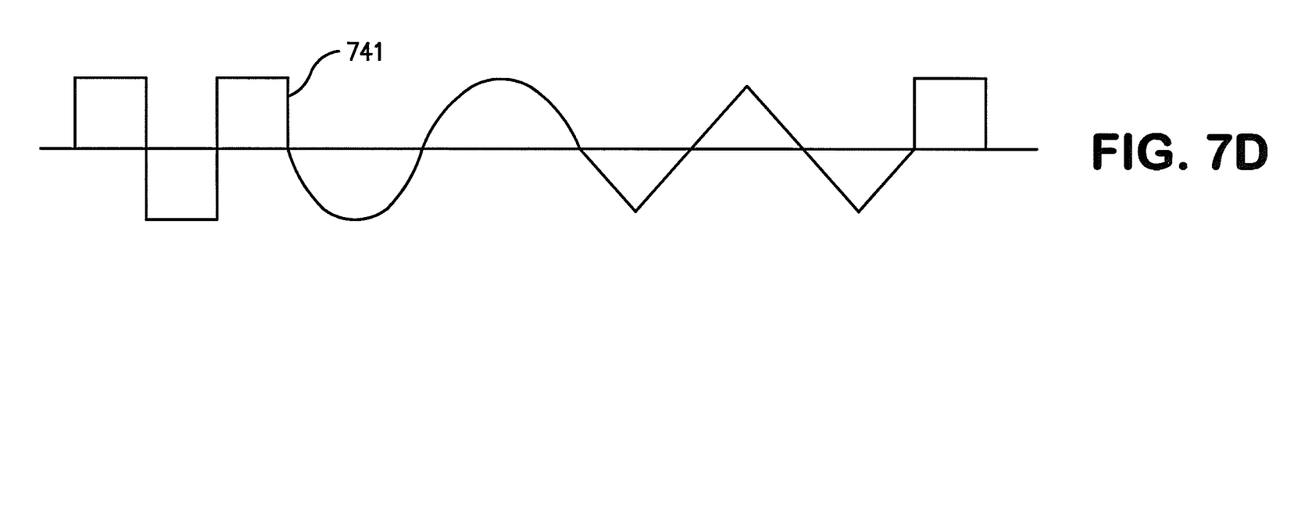

FIG. 7D shows yet another example of a survey path in accordance with one embodiment of the present invention. Here, survey path 741 follows a series of linked, deviated survey paths. The term, "deviated," as used herein refers to any series of survey paths, the combination of which deviates from a straight path. Examples of suitable deviated survey paths in accordance with the present invention include, but are not limited to, square wave survey paths, triangle survey paths, any of the aforementioned survey paths, or any combination thereof.

It is explicitly recognized that any of the elements and features of each of the devices described herein are capable of use with any of the other devices described herein with no limitation. Furthermore, it is explicitly recognized that the steps of the methods herein may be performed in any order except unless explicitly stated otherwise or inherently required otherwise by the particular method.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations and equivalents are considered within the scope and spirit of the present invention. Also, the terms in the claims have their plain, ordinary meaning unless otherwise explicitly and clearly defined by the patentee.

What is claimed is:

1. A method for acquiring seismic data for a subsea region of the earth comprising the steps of:
    providing first and second marine vessels each with a plurality of seismic streamers, wherein the plurality of seismic streamers are coupled to the marine vessels for towing, wherein each seismic streamer comprises a plurality of marine seismic receivers spaced apart along the length of each seismic streamer;
    providing a plurality of marine seismic sources;
    introducing the marine seismic sources into a marine environment in range of the marine seismic receivers;
    towing the seismic streamers through the marine environment such that the first marine vessel and the seismic streamers coupled thereto travel substantially along a first series of linked curved paths and the second marine vessel and the seismic streamers coupled thereto travel substantially along a second series of linked curved paths inverted with respect to the first series of linked curved paths;
    exciting at least one of the marine seismic sources within range of both the first and second marine vessels while towing the seismic streamers so as to cause acoustic wave energy to travel through the marine environment into the subsea region of the earth;

allowing the acoustic wave energy to reflect and refract from the subsea region so as to form reflected and refracted wave energy; and detecting the reflected and refracted wave energy with the marine seismic receivers of both the first and second marine vessels surveying in cooperation with one another so as to form detected seismic data.

2. The method of claim 1 further comprising the step of maintaining for each of the vessels the plurality of seismic streamers in a flared configuration.

3. The method of claim 2 wherein one or more of the seismic streamers are steerable streamers and wherein the step of maintaining further comprises steering the steerable streamers into the flared configuration.

4. The method of claim 1 wherein the first series of linked curved paths comprise a plurality of half-ellipses.

5. The method of claim 4 wherein the plurality of half-ellipses are substantially identical in shape and wherein one or more of the seismic streamers has a length at least as long as a length circumscribed by half of one of the half-ellipses.

6. The method of claim 5 wherein one or more of the seismic streamers has a length at least as long as the length circumscribed by one of the half-ellipses.

7. The method of claim 4 wherein each half-ellipse is inverted with respect to each adjacent ellipse thereto.

8. The method of claim 1 wherein the first series of linked curved paths substantially forms a sinusoidal wave.

9. The method of claim 8 wherein the sinusoidal wave has a substantially constant wavelength and wherein one or more of the seismic streamers have a length at least as long as a quarter of the wavelength of the sinusoidal wave.

10. The method of claim 9 wherein one or more of the seismic streamers has a length at least as long as half a wavelength of the sinusoidal wave.

11. The method of claim 1 wherein the first series of linked curved paths substantially forms a plurality of linked half-sine waves.

12. The method of claim 11 wherein one or more of the half-sine waves has an amplitude or a wavelength different than an adjacent half-sine wave thereto.

13. The method of claim 1 further comprising the steps of:
storing the detected seismic data in a data storage device;
processing the detected seismic data with one or more interpreters so as to produce seismic information representative of the subsea region of the earth; and
graphically displaying seismic information on a display.

14. The method of claim 1 wherein one or more of the plurality of marine seismic sources are coupled to the marine vessel.

15. The method of claim 1 wherein the second series of linked curved paths intersect or directly interface with the first series of linked curved paths.

16. The method of claim 1 wherein the second series of linked curved paths cooperate with the first series of linked paths such that the first series and the second series form two sinusoidal waves that only intersect or directly interface one another every half wavelength.

17. The method of claim 1 wherein the first series substantially forms a first sinusoidal wave and wherein the second series substantially forms a second sinusoidal wave that only intersects with the first sinusoidal wave every half wavelength.

18. The method of claim 1 wherein the first series substantially forms a first plurality of linked half-sine waves and wherein the second series substantially forms a second plurality of linked half-sine waves only directly interfaces with the first plurality of linked half-sine waves every half wavelength such that the combination of the first series and the second series forms two sinusoidal waves that are inverse to one another.

19. The method of claim 18 further comprising the steps of:
storing the detected seismic data in a data storage device;
processing the detected seismic data with one or more interpreters so as to produce seismic information representative of the subsea region of the earth;
graphically displaying seismic information on a display;
wherein the sinusoidal wave has a substantially constant wavelength and wherein one or more of the seismic streamers have a length at least as long as a quarter of the wavelength of the sinusoidal wave;
wherein one or more of the plurality of marine seismic sources are coupled to the second marine vessel;
wherein one or more of the seismic streamers are steerable streamers; and
steering the steerable streamers into the flared configuration.

20. A method for acquiring seismic data comprising the steps of:
providing first and second marine vessels each with a plurality of seismic streamers, wherein the plurality of seismic streamers are coupled to the marine vessel for towing, wherein each seismic streamer comprises a plurality of marine seismic receivers spaced apart along the length of each streamer;
providing one or more marine seismic sources;
introducing the marine seismic sources into a marine environment in range of the marine seismic receivers;
towing the seismic streamers through the marine environment such that the first marine vessel and the seismic streamers coupled thereto travel substantially along a first series of linked curved paths and the second marine vessel and the seismic streamers coupled thereto travel substantially along a second series of linked curved paths inverted with respect to the first series of linked curved paths;
maintaining the seismic streamers in a flared configuration for each of the vessels;
exciting at least one of the marine seismic sources within range of both the first and second marine vessels while towing the seismic streamers so as to cause acoustic wave energy to travel through the marine environment into the subsea region of the earth;
allowing the acoustic wave energy to reflect and refract from the subsea region so as to form reflected and refracted wave energy; and
detecting the reflected and refracted wave energy with the marine seismic receivers of both the first and second marine vessels surveying in cooperation with one another so as to form detected seismic data.

21. The method of claim 20 wherein the flared configuration is characterized by a rearward lateral seismic receiver span that is at least about 20 percent greater than a forward lateral seismic receiver span.

* * * * *